Sept. 2, 1969   C. V. DE VRIES ET AL   3,464,192
AGRICULTURAL APPARATUS
Filed Oct. 19, 1966   2 Sheets-Sheet 1
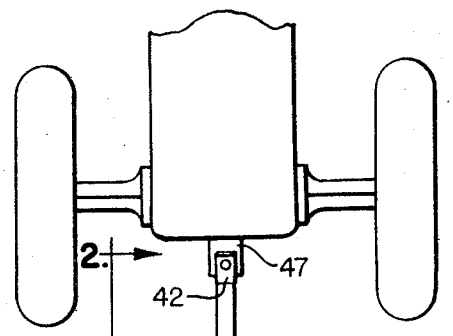
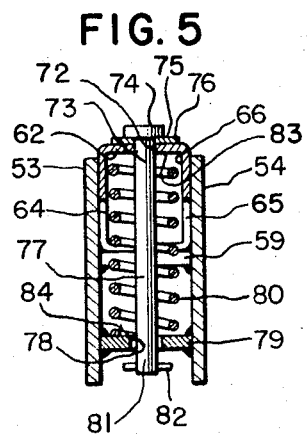
FIG. 5
FIG. 1
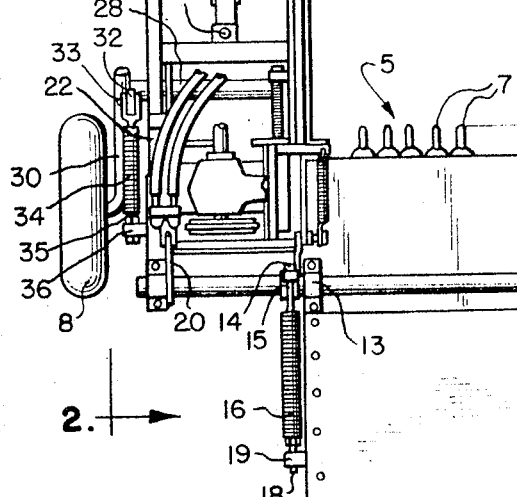
Inventors
CHARLES V. DE VRIES
ARNOLD ZIMMERMAN
John J. Kowalik
Attorney Sept. 2, 1969  C. V. DE VRIES ET AL  3,464,192
AGRICULTURAL APPARATUS Filed Oct. 19, 1966  2 Sheets-Sheet 2

Inventors
CHARLES V. DE VRIES
ARNOLD ZIMMERMAN

John J. Kowalik
Attorney

United States Patent Office 3,464,192
Patented Sept. 2, 1969

3,464,192
AGRICULTURAL APPARATUS
Charles V. DeVries, Palos Park, and Arnold Zimmerman, Downers Grove, Ill., assignors to International Harvester Company, Chicago, Ill., a corporation of Delaware
Filed Oct. 19, 1966, Ser. No. 587,820
Int. Cl. A01d 35/02, 35/04
U.S. Cl. 56—25                    11 Claims

ABSTRACT OF THE DISCLOSURE

A device for overcoming static inertia to promote springing of an implement over obstructions, the device comprising a pair of vertically superposed portions, of a draft structure one connectible to a tractor and the other attached to the implement, and a spring interposed therebetween and supporting the implement-connected other portion and arranged to initiate upward springing motion when the implement strikes an obstruction to overcome the static inertia of the implement to upward movement whereby the springs supporting the implement are caused to lift the implement upwardly.

---

This invention relates to agricultural apparatus and more specifically the type which is used to harvest forage crops and which incorporates a mower along its leading edge for severing the crops from the ground, the invention being particularly directed to a novel mechanism for overcoming the static inertia of the apparatus in hurdling over an obstruction which may be encountered by the mower bar whereby the apparatus is protected from damage.

In machines of the type under consideration it has been a practice to spring-mount the equipment so that it readily would yield upwardly in passing over an obstruction. However, as such apparatus is extremely unwieldy being anywhere from 7 to over 9 feet long and transverse to the direction of operation and because of requirements to keep the mounting wheels clear of the crops to be cut it has been necessary to compromise the position of the support wheels as well as the mounting of the counterbalancing springs so that they would not be in position to obstruct the operating components of the apparatus or tangle in the crops. Excessively large springs have had to be used and the wheels and the linkage arranged at a mechanical disadvantage in order to meet these foregoing limitations.

It is a general object of the invention to provide a novel means in agricultural apparatus such that upon the mower portion striking an obstruction, the static inertia is instantly overcome and dynamic moment is established to initiate operation of the primary counterbalancing mechanism.

More specifically, the invention contemplates the provision of a pair of laterally offset support wheels which are also offset fore and aft with respect to the direction of operation of the implement, wheels being spring loaded in a direction tending to lift the agricultural apparatus by swinging the wheels under the mechanism and wherein the agricultural apparatus comprises a hitch tongue with front and rear portions interconnected on a substantially horizontal axis, the hitch having its rear portion connected to the apparatus and its front portion connectible to the drawbar of a tractor and the said portions of the hitch having spring means interposed therebetween and biased in a direction jackknifing or tending to jackknife the hitch portions upwardly whereby upon the mower portion striking an obstruction, the apparatus immediately tends to rise whereby overcoming the static inertia.

The invention further contemplates provision of a novel hitch member which can be readily incorporated into existing equipment in which the lift mechanism has a mechanical advantage such that as soon as the obstruction is encountered, the resistance to forward movement of the apparatus immediately causes jackknifing of the tongue.

These and other objects and advantages inherent in and encompassed by the invention will become more readily apparent from the specification and the drawings wherein:

FIGURE 1 is a plan view of one form of agricultural apparatus embodying the invention;

FIGURE 5 is a cross sectional view taken on line 5—5 of FIGURE 3.

Description of the invention

Figure 4:
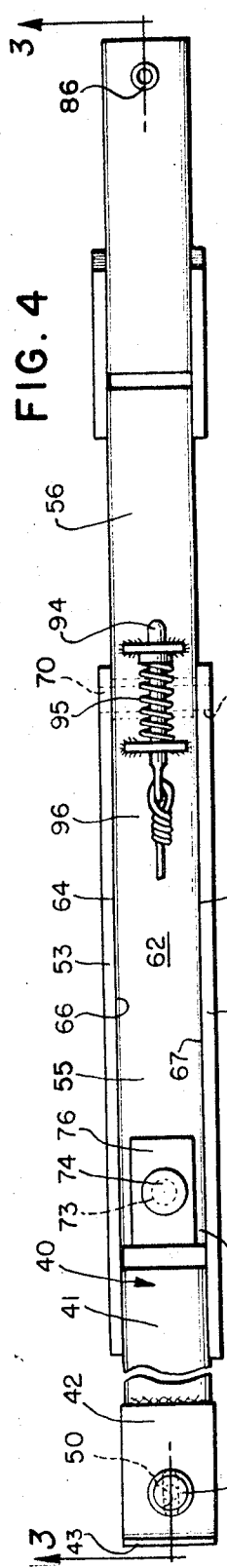
FIGURE 4 is a fragmentary top plan view of the tongue.
Figure 3:
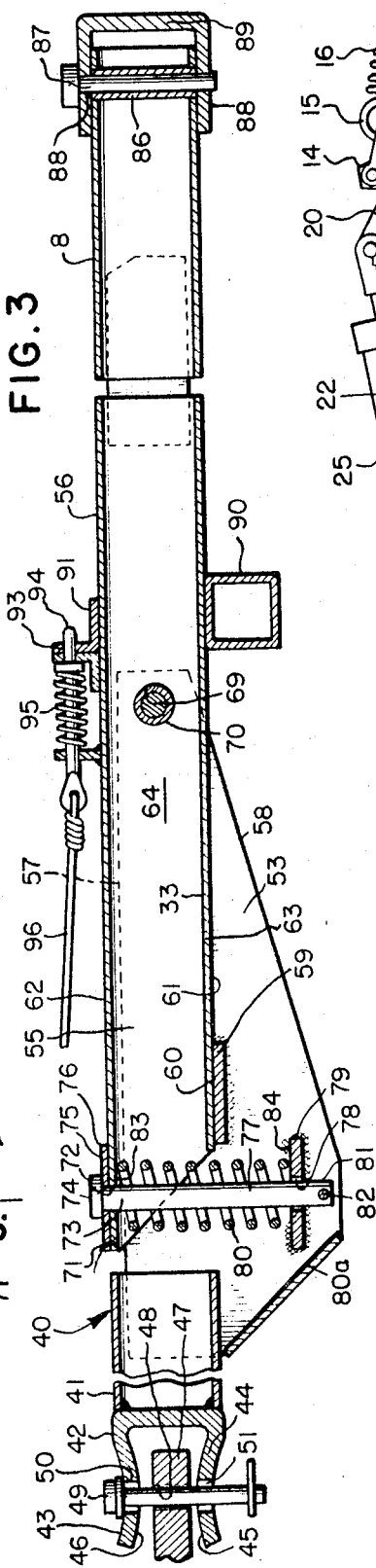
FIGURE 3 is a longitudinal sectional view substantially on line 3—3 of FIGURE 4.
Figure 2:
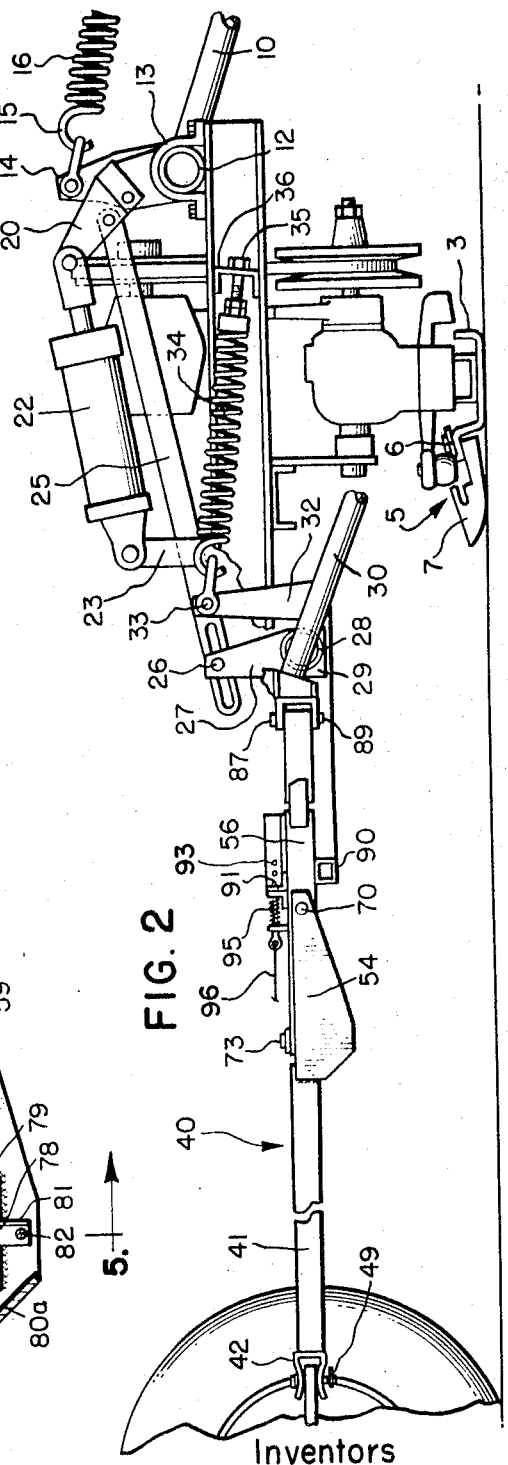
FIGURE 2 is an enlarged sectional view taken substantially on the line 2—2 of FIGURE 1.

Invention is shown in connection with agricultural apparatus generally designated 2 and in the present instance is of a type commonly known as a mower crusher which has a suitable framework 3 with pair of conditioning rollers 4 (only one of which is shown), which are supported from the frame 3 directly behind a mower assembly 5 which is also supported from a suitable portion of the framework 3. The mower assembly includes a reciprocating sickle 6 and a plurality of forwardly projecting mower guards 7 which, in normal operating position, are directed downwardly and forwardly as shown in FIGURE 2.

The apparatus is supported from a pair of laterally and fore and aft offset front and rear wheels 8 and 9, rear wheel 9 being connected to a rearwardly directed arm 10 which has its forward upper end connected to a torque member 12 which is journalled from suitable bearings 13 connected to the frame structure 3. The torque element, which may be in the nature of a tube, extends from the right hand of the machine to the left hand of the machine and at its leftward end as seen in FIGURE 1 is connected to an upstanding arm 14 which at its upper end is suitably connected to one end 15 of a counterbalance spring 16. Spring 16 is connected as at 18 to a suitable anchor 19 mounted on the frame 3 in the position rearwardly in respect to the spring and the arm 14 whereby the spring is caused to be in tension continuously and tends to rotate the torque tube 12 in a clockwise direction in FIGURE 2 thereby biasing the downwardly and rearwardly extending arm 10 which mounts the wheel 9, in a downward or clockwise direction whereby causing the wheel to be pressed against the ground and reactively tending to lift the agricultural machine upwardly.

The torque member 12 is suitably connected through appropriate linkage 20 to a hydraulic ram 22, which is connected as at 23 to a suitable anchor on the frame 3, the linkage 20 providing a lost motion connection with the torque member 12 so that upon the ram 22 being deactivated the spring 16 is effective to float and support the right end of implement 3 through the wheel 9. Linkage 20 is connected suitably through the lost motion linkage 25 to a sliding pivot 26 at the upper end of arm 27, the arm 27 being connected to a torsional tubular element 28 which is mounted in suitable bearing supports 29 on the frame 3 at the left end of the machine. The torsion element 28 is connected to the upper end of a downwardly and rearwardly extending wheel arm 30 which mounts the wheel 8.

It will be seen that the action of rotation of the element 28 and the element 12 are substantially parallel. The arm 30 is connected to the lower end of an unstanding lever arm 32, which at its upper end is connected as at 33 to the forward end of a tension spring 34, spring 34 having its rear end connected as at 35 to a suitable anchor member 36 which is part of the framework. The spring 34 biases the arm 30 in a clockwise direction as viewed in FIGURE 2 and thus the unit 2 is counterbalanced about an effective diagonal axis.

This type of counterbalance is adequate under normal circumstances and it would appear that by adjusting the nuts 35 and the connection at 18 the springs could be loaded sufficiently to allow the machine to lift off the ground under any circumstances. However, in fact, in view of the disposition of the support arms and wheels it has been virtually impossible to adjust the tension of the springs 16 and 34 so that if the mower should strike an obstruction the unit would elevate immediately.

If the springs were loaded to lighten the dead weight of the unit it tended to bounce excessively over the field so that an uneven cut was produced and its operation seriously impaired, and if the springs were unloaded to alleviate such a condition, the dead weight of the unit would be too heavy and the springs would not be sufficiently responsive upon the unit meeting such an obstruction so that serious damage to the equipment occurred.

In order to augment the lifting action of springs without consequence of the aforementioned deficiencies, the tongue or draft generally designated 40 is made of two parts, a front part 41 and a rear part 56. the front portion 41 has a clevis structure 42 secured to its forward end. The clevis structure includes upper and lower jaw members 43, 44 presenting opposing convex faces 45 and 46 for admitting a flat drawbar element therebetween. The drawbar element has a vertical opening 48 therein admitting a vertical pin 49 therethrough and the pin 49 extends through longitudinally elongated slots 50 and 51 in said jaw elements 43, 44 whereby the tongue is accommodated universal angling with respect to the drawbar 47, that is about a horizontal pivot of the pin 49 and vertical pivot about the pin in view of the elongated slots 50 and 51. The rear end portion of the front part 41 is provided with a pair of laterally spaced, generally vertical side plates 53, 54 which flank the forward end portion 55 of the rear part 56 of the tongue. The side portions 53, 54 are provided intermediate their upper and lower edges 57 and 58 with a transverse generally horizontal seating plate or element 59 which is suitably connected with the plates 53 and 54. The seating plate 59 provides a stop and a seat as at 60 for the bottom edge 61 of the forward portion 55 of the rear part of the tongue portion 56 which is substantially of box form in cross-section and has top and bottom walls 62, 63 and side walls 64 and 65. The side walls 64 and 65 have their external sides in guided engagement with the interior sides 66 and 67 of the plates 53 and 54. The elements 53 and 54 as well as the side walls 64 and 65 are horizontally apertured as at 69 and admit a pivot assembly 70 therethrough which provides pivotal movement therebetween on a substantially horizontal axis. The forward end portion 55 at its forward extremity 71 is provided with a vertical aperture 72 which admits a vertical pin 73 therethrough, said pin 73 having a head 74 which seats as at 75 on the top wall 62 through a washer 76. The pin 72 has a shank portion 77 which extends through an opening 78 in a seat plate or element 79 which extends between and interconnects the plate portions 53, 54. The pin or pin portion 77 extends below the plate 79 and has a lower portion 81 where it is provided with a transverse pin 82 for abutment with the underside of the plate 79 to limit upward movement of the front end of the rear portion thereby limiting the jackknifing action of the front and rear portions about the axis of the pin 70. The pin 73 is confined at its lower end adjacent to the apex of the plate portions 53 and 54, the apex being defined by the forward edges 80a and the bottom edges 58 of the substantially triangular shaped side plate portions 53 and 54.

The mechanism is balanced by a compression spring 80 sleeved over the shank portion 77, and said spring 80 bearing at its upper end as at 83 against the underside of the wall 62 and as at 84 against the top side of the seat plate 79 and it is so loaded as to initially overcome the static inertia of the unit as hereinafter explained.

The tongue has its rearward end provided with a vertical aperture or sleeve 86 which admits a pin 87 therethrough, the pin 87 extending through vertically aligned aperture 88 in a beam member of frame portion 89 of the frame work of the implement whereby the tongue affords a draft connection between the implement and tractor through the tongue. Pivot 87 accommodates horizontal adjustment to the tongue for transport and operating position of the implement as is well known to those skilled in the art. It will be observed that the tongue is confined intermediate its ends between the upper and lower guides 90 and 91 which form part of the frame structure of the implement and that the upper guide is in the form of a curved track with a series of apertures 93 therein, said apertures 93 admitting the rear end of a bolt 94 therethrough to lock the bolt. The bolt is spring loaded as at 95 in conventional manner and being connected to an operating member in 96 in the form of a rope which may be extended to the operator's station.

It will be noted that the axis of pivot about the horizontal axis 70 of the tongue ports is above in close proximity to the mower guard 7 and thus the anti-static inertia means or inertia-overcoming means comprising the compression spring 80 and the pivotal connection between the front and rear ports of the tongue and the location of this pivot is such that as soon as the mower guards strike an obstruction the tongue breaks and the guards tilt upwardly and the unit is caused to move rapidly slightly but sufficiently to overcome the static load whereupon the principal counterbalancing springs take over.

What is claimed is:

1. In a corp harvesting machine, a harvesting component having a forward edge portion including a mower comprising forwardly projecting mower guards and a sickle reciprocal upon the guards, wheel means at opposite sides of said component and arms pivotally mounted to said component and rotatably mounting respective wheel means for rotation about axes extending transversely of the direction of movement of said machine in operation, spring means operatively connected between each arm and said component biasing the wheel means downwardly against the ground and the harvesting component upwardly, a draft tongue having a rear end portion connected to the harvesting component and having a forward end portion including means for connection to an associated prime mover, means articulatingly interconnecting said front and rear portions of the draft tongue for vertical jackknifing movement, and inertia-overcoming means reactively associated with said tongue portions for overcoming static inertia of the machine to rise over an obstruction upon said mower guards striking the same whereby promoting springing action of said spring means for lifting said component through said arms.

2. The invention according to claim 1 and said inertia-overcoming means located above the mower adjacent thereof.

3. The invention according to claim 1 and said inertia-overcoming means comprising spring means reactively connected to said front and rear portions and biased in a direction tending to jackknife said portions upwardly with attendant elevation of said harvesting component upwardly at said guards whereby tilting the guards upwardly to facilitate their sliding over an encountered obstruction.

4. The invention according to claim 1 and said inertia-overcoming means comprising a vertically oriented compression spring means having a lower end bearing against said front portion of the tongue and having an upper end engaging said rear portion of the tongue, and said articulated connection being located in an area between said compression spring means and the connection of said rear portion to said harvesting component.

5. The invention according to claim 4 and said articulating means comprising a generally horizontal pivot.

6. The invention according to claim 1 and said means articulatingly connecting said portions comprising a generally horizontal pivot between said portions of the tongue, and said inertia-overcoming means comprising a vertically oriented compression spring means interposed between said portions, and limiting means disposed in parallel with said spring means for limiting said jackknifing movements between said portions.

7. The invention according to claim 6 and said limiting means comprising a pin having abutment means respectively below and above said portions and said pin extending through said compression spring means.

8. The invention according to claim 7 and said compression spring means disposed adjacent to and at an elevation above the mower for immediate response to an obstruction encountering the mower so as to initiate upward movement of the component and thereby overcome the static inertia tending to maintain said unit at rest.

9. The invention according to claim 1 and part one of said portions of the tongue having vertical side elements at one end flanking the adjacent end of the other element to prevent relative pivoting about the longitudinal axis of the tongue between said portions through abutment of said side elements with corresponding sides of the other portion, said elements being substantially triangular in side elevation and having downwardly converging lower edges terminating in an apex, a transverse seat member interconnecting said elements in the area of said apex, said rear element having the said end portion thereof projecting over said seat member, the said end of the rear element having a forward diagonal edge sloping downwardly and rearwardly in clearing relation to said seat member, said end portion of the rear portion having a top wall, said top wall and seat member having vertically aligned apertures, a pin loosely extending through the apertures and having a head at its upper end overlying the top wall and having abutment means at its lower end underlying said seat member, and a compression spring sleeved over the pin and seated respectively under said top wall and upon said seat member.

10. The invention according to claim 9 and said pin having a lower end extending below said seat member and said abutment means being spaced below said seat member in the normal position of said tongue portions.

11. In a farm implement comprising a sprung component having parts operative in close association with the ground which are subject to breakage upon striking obstructions in the path of traverse of the implement, means for overcoming the inertia to the component to rise over such obstructions comprising draft means having one portion connectible to a towing vehicle and another portion connected to the component and means interposed between said portions resiliently supporting the component-connected portion from said one portion and adapted to initiate lifting of the component upon the same striking an obstruction whereby overcoming the inertia of the component to upward movement.

References Cited

UNITED STATES PATENTS

| | | | |
|---|---|---|---|
| 2,005,045 | 6/1935 | Nelson | 172—678 |
| 2,634,986 | 4/1953 | McDaniel | 280—489 |
| 2,797,934 | 7/1957 | Helgeson | 280—489 |
| 2,989,830 | 6/1961 | Pristo | 56—1 |
| 3,175,343 | 3/1965 | Johnston et al. | 56—1 |
| 3,180,657 | 4/1965 | Molter | 280—489 |
| 3,239,242 | 3/1966 | Adams | 280—489 |
| 3,342,502 | 9/1967 | Sancioni | 280—489 |
| 3,343,848 | 9/1967 | Dorschner | 56—1 |

ROBERT PESHOCK, Primary Examiner

P. A. RAZZANO, Assistant Examiner

U.S. Cl. X.R.

280—489